2,678,468

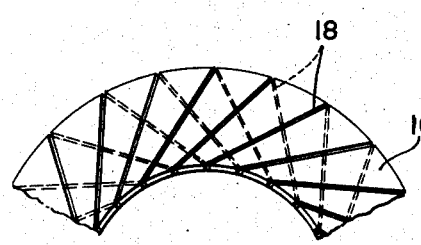
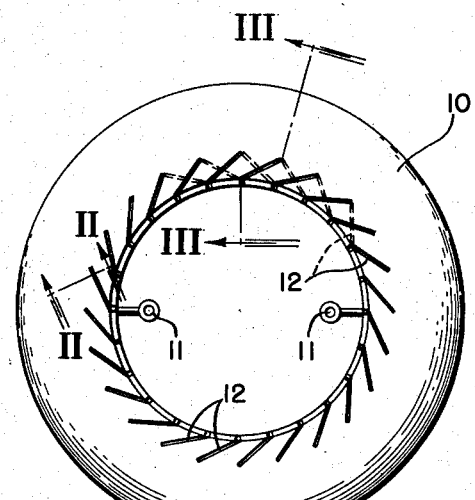
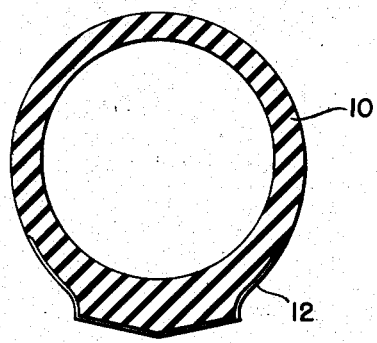
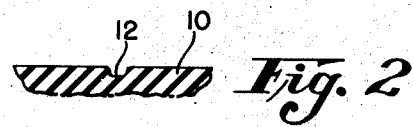
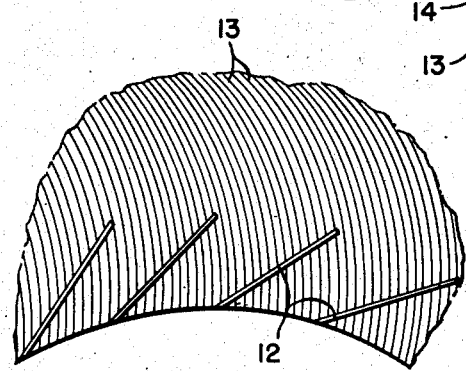
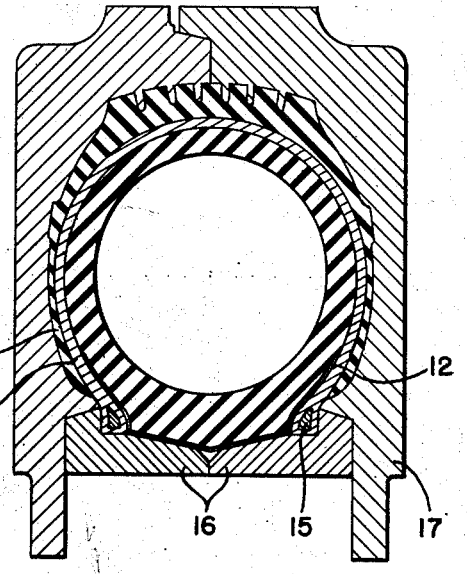
INVENTOR.
HUBERT T. SMITH Patented May 18, 1954

UNITED STATES PATENT OFFICE 2,678,468

VENTED CURING BAG

Hubert T. Smith, St. Clair Shores, Mich., assignor to United States Rubber Company, New York, N. Y., a corporation of New Jersey Application February 21, 1951, Serial No. 212,043

4 Claims. (Cl. 18—45)

This invention relates to a curing bag for curing tire casings and in particular to a curing bag provided with venting grooves in its outer surface to prevent entrapment of air between the curing bag and the tire casing during the curing operation.

The advantages of providing a curing bag with venting means to prevent entrapment of air between the bag and the tire casing and therefore fabric separation and blisters caused thereby during curing have been recognized by the prior art. A curing bag provided with venting means is disclosed in United States Patent No. 2,476,831. According to this patent, ribs are provided on the outer surface of the bag. The ribs extend aross the inner circumference of the bag and radially up each side of the bag. When the outer surface of the bag presses against the inside surface of the tire casing, the ribs cause a slight bridging of the tire over said ribs and form small vent passages.

The present invention differs from the prior art in a number of features. One is that vent grooves rather than ribs are provided on the exterior surface of the curing bag. Ribs on the exterior surface of a curing bag bend or distort the tire reinforcing cords during the curing of the tire and may produce a failure of the tire during severe service. Grooves on the other hand, do not distort the tire cords to any objectionable extent. Ribs also tend to flatten out and disappear at a faster rate than grooves under continuous use. To replace the ribs, the curing bag must be remolded, a necessarily expensive and time-consuming operation. Grooves on the other hand may be easily recut by a cutting tool at any time with small expense of time and labor. The grooves also form ribs on the interior surface of the tire casing during the curing of the tire. These ribs so formed provide a venting passage between the tire casing and an inner tube when the tire is in service. Such ribs are especially effective when used in conjunction with a ribbed inner tube such as shown in United States Patent No. 2,041,534. On the other hand, ribs on the curing bag form grooves in the inner wall of the tire casing which may pinch the inner tube when the tire is put into service.

The present invention also differs from the prior art, in that the grooves extend at an acute angle to the inner circumference of the curing bag. In the prior art, the ribs extend radially rather than at an acute angle. It has been found that air trapped between the curing bag and the tire casing tends to follow the small passages existing between adjacent cords of the inner or band ply of the tire casing. Air in these small passages cannot, however, exhaust past the bead portion of the tire. It is, therefore, important that the venting passages of the curing bag extend across all the cords of the tire to insure that all the air is exhausted.

The cords of a tire extend at a comparatively large angle to the inner circumference of the tire with the result that if the venting grooves or ribs are made radial they will extend across the cords at a very acute angle and accordingly must be made quite long to extend across very many cords.

In the present invention, the vent grooves extend at an acute angle to the inner circumference of the curing bag and are arranged to extend across the cords at an angle of approximately 90°. Thus, for the same length of grooves and for the same circumferential spacing of the grooves, the grooves of the present invention will extend across many more cords than the radial ribs of the prior art.

The angularity of the grooves of the present invention wherein the grooves extend at an acute angle to the inner circumference of the bag is also important in regard to the cords of the tucked under portion of the outer fabric ply of the tire. In manufacturing a tire, the outer fabric ply is tucked around the bead of the tire and extends a short distance up the interior wall of the tire. The cords of the tucked under portion when tucked around the bead extend substantially radially to the inner circumference of the tire. If the grooves are made radial, then the radially extending cords tend to be lifted up into the grooves during the curing operation thereby resulting in defective tires. By making the grooves at an acute angle to the inner circumference of the curing bag, they will meet the tucked under cords at a comparatively large angle, thereby eliminating the tendency of the cords to be lifted during the curing operation.

Other objects and advantages of the present invention will become apparent from the following description when read in conjunction with the accompanying drawing, wherein:

Fig. 1 is a side elevational view of a curing bag embodying the present invention;

Fig. 2 is an enlarged sectional view taken on the line II—II of Fig. 1;

Fig. 3 is an enlarged sectional view taken on the line III—III of Fig. 1;

Fig. 4 is a partial view of the interior wall of a tire casing showing the relative angular relationship of the vent grooves of the curing bag of the invention and the reinforcing cords of the tire casing;

Fig. 5 is an elevational view of a section of a curing bag embodying the present invention for use in curing heavy duty tires for low speed service, the vent grooves being extended to the crown of the bag; and Fig. 6 is an enlarged sectional view showing the relative position of the curing bag of the present invention, a tire casing, and a tire curing mold.

Referring to the drawing and in particular to Fig. 1 of the drawing, a curing bag 10 of rubber or rubber-like material is provided with inflating stems 11 as is well known in the art. Extending across the inner circumference and up each side of the curing bag 10 are a plurality of circumferentially spaced venting grooves 12 either cut or molded in the exterior surface of the curing bag. The extent of the grooves 12 is best shown in Fig. 3 and the cross-sectional shape of the groove is best shown in Fig. 2.

As can be seen in Fig. 1, the grooves 12 extend up the side of the curing bag 10 at an acute angle to the inner circumference of the curing bag. In practice this angle is made to be approximately 45° to the inner circumference of the curing bag or expressed in other terms as 45° to a radial plane through the bag. As is shown by the dotted lines, that portion of the groove extending up the rear side of the curing bag extend in an opposite direction to that portion of the groove extending up the front side of the curing bag. The function of this structure is best described by reference to Fig. 4.

Fig. 4 shows the angular relationship between the grooves and the reinforcing cords 13 of the inner or band ply of a tire 14. The cords are bias laid as is the usual construction and extend at an angle to the inner circumference of the tire. As is the usual construction, the cords are covered with a layer of rubber, but the rubber is not thick enough to fill completely the spaces between the cords with the result that the space between the cords define small grooves or passages. It has been found that air trapped between the curing bag and the inner wall of the tire carcass tends to travel down these passages formed between adjacent cords until it reaches the bead portion 45 (Fig. 6) of the tire. At this point it is prevented from flowing further by the extremely tight fit between the curing bag and the tire casing. By extending the grooves 12 in the curing bag 10 past this point, the air can pass down the grooves and out through the clearance that exists between the toe rings 16 of the curing mold 17.

For the grooves 12 to be most effective in exhausting the air, they should therefore extend collectively across each of the tire cords 13. By extending the grooves at an angle of 45° to the inner circumference of the curing bag, a shorter groove and less grooves may be used and still have them extend collectively across each tire cord, as the cords extend at approximately 45° to the inner circumference of the tire casing and therefore the grooves will cross the cords at approximately right angles. Obviously the optimum construction would be to have the grooves across the cords at exactly 90° but as tire construction is not that precise, the most practical solution is to make the grooves to extend at 45° to the inner circumference of the bag thereby insuring that the grooves will cross all the cords at approximately 90° and that none of the grooves will be parallel to the cords. The grooves on the rear side of the curing bag must extend in the opposite direction because the extension of the bias laid cords 13 on the corresponding side of the tire casing extend in the opposite direction.

With reference to Fig. 4, it can readily be seen that if the grooves 12 were positioned to extend radially, they would have to be much longer to extend across the same number of cords as they do in the angular position or there would have to be a considerably greater number of grooves provided. As can be seen from Fig. 4, each groove is extended sufficiently to extend across at least one of the same tire cords across which an adjacent groove extends, to insure that each tire cord will be in communication with at least one groove.

As can be seen in Figs. 1, 3, 4 and 6, the grooves 12 in the curing bag 10 extend only a short distance up the side walls of the curing bag so as to extend across the bead portion 15 of the tire 14. The grooves are stopped at a point below that point on the curing bag which corresponds to the flexing point of the tire, that is, the point in the side wall of the tire that receives the greatest amount of flexing when the tire is in service. This particular curing bag structure is for use in curing tires intended for high speed service such as for passenger car service. In high speed service, the side walls of the tire are subjected to a high rate of flexing at high temperatures. If the grooves 12 of the curing bag were extended up to and beyond this flexing point, some of the rubber from this point would flow into the grooves during the curing of the tire casing, thereby weakening the side walls of the tire at the flexing point which would result in early side wall failure.

In heavy duty tires for low speed service, such as tractor tires, the flexing of the side walls of the tire is not as critical and the grooves in the curing bag for curing such tires may be extended to the crown of the curing bag, such as is shown by the grooves 18 of Fig. 5. Heavy duty, low speed tires usually have large traction cleats or lugs on the tread thereof. It is at this point that the most trouble from trapped air between the curing bag in the tire casing occurs in heavy duty tires due to the fact that a considerable amount of rubber tread stock must be forced into the mold cavities to form cleats or lugs. By extending the grooves 18 to the crown of the bag, it is insured that no air will be trapped in this region. The weakening of the side walls by reason of rubber flowing into the grooves is not as critical in low speed tires because the rate of flexing and temperature is much lower than in high speed tires.

In the curing operation, the tire 14 with the bag 10 mounted therein and the toe rings 16 in place is laid in the mold 17 (Fig. 6) and the mold closed. The bag 10 is inflated to the desired pressure by introducing air, water, steam or the like into the bag through the stem 11. As the bag is inflated it expands and forces the tire 14 against the mold 17. Air trapped between the curing bag and the inner wall of the tire casing flows down the passages formed by the reinforcing cords 13 into the grooves 12 past the bead portion 15 out through the clearance existing between the toe rings 16.

It is to be understood that the above description and accompanying drawing is for the purpose of illustration only and not by way of limitation and changes and modifications may be made therein without departing from the spirit and scope of the invention.

Having thus described my invention, what I claim and desire to protect by Letters Patent is:

1. A curing bag for curing tire casings, said curing bag having circumferentially spaced comparatively narrow venting grooves formed in the outer surface thereof, said grooves extending continuously across the inner circumference and up each side of the curing bag at an acute angle to the inner circumference so that each groove will extend at a large angle across a number of reinforcing cords in a tire casing to be cured.

2. A curing bag for curing tire casings, said curing bag having a plurality of circumferentially spaced comparatively narrow venting grooves formed in the surface thereof, said grooves extending continuously across the inner circumference and up each side of the bag at an acute angle to the inner circumference so that each groove will extend at a large angle across a number of reinforcing cords in a tire casing to be cured, said grooves being spaced such a distance apart that a portion of each groove will extend across at least one of the same tire cords across which an adjacent groove extends.

3. A curing bag for curing high speed tire casings, said curing bag having a plurality of circumferentially spaced comparatively narrow venting grooves formed in the outer surface thereof, said grooves extending continuously across the inner circumference and up each side of the bag to a position just below the point on the bag corresponding to the maximum flexing point of the casing to be cured, and at an acute angle to the inner circumference of the curing bag so that each groove will extend at a large angle across a number of reinforcing cords in the tire to be cured.

4. A curing bag for curing heavy duty, low speed tire casings, said curing bag having comparatively narrow venting grooves formed in the outer surface thereof, said grooves extending continuously across the inner circumference and up each side of the bag to the crown of the bag and at an acute angle to the inner circumference of the curing bag so that each groove will extend at a large angle across a number of reinforcing cords in the tire to be cured.

References Cited in the file of this patent

UNITED STATES PATENTS

| Number | Name | Date |
|---|---|---|
| 1,470,657 | Traum | Oct. 16, 1923 |
| 1,699,600 | Mann | Jan. 22, 1929 |
| 1,931,649 | Eger | Oct. 24, 1933 |
| 2,031,560 | Day | Feb. 18, 1936 |
| 2,041,534 | Eger | May 19, 1936 |
| 2,476,831 | Spencer | July 19, 1949 |